(12) United States Patent
Kitano et al.

(10) Patent No.: US 6,224,702 B1
(45) Date of Patent: May 1, 2001

(54) METHOD OF MANUFACTURING OPTICAL DISCS

(75) Inventors: Ryoko Kitano; Mikuni Amo, both of Komatsushima (JP)

(73) Assignee: Kitano Engineering Co., Ltd., Tokushima-ken (JP)

( * ) Notice: Subject to any disclaimer, the term of this patent is extended or adjusted under 35 U.S.C. 154(b) by 0 days.

(21) Appl. No.: 09/322,489

(22) Filed: May 28, 1999

(30) Foreign Application Priority Data

Jun. 1, 1998 (JP) .................................................. 10-169263

(51) Int. Cl.$^7$ ....................................................... B32B 31/28
(52) U.S. Cl. ..................... 156/74; 156/273.7; 156/275.5; 156/275.7; 156/567; 156/285
(58) Field of Search ................... 156/74, 273.7, 156/275.5, 285, 286, 567

(56) References Cited

U.S. PATENT DOCUMENTS

| | | |
|---|---|---|
| 4,877,475 | 10/1989 | Uchida et al. . |
| 4,990,208 | 2/1991 | Kano . |
| 4,995,799 | 2/1991 | Hayashi et al. . |
| 5,197,060 | 3/1993 | Yatake . |
| 5,364,256 | 11/1994 | Lipscomb et al. . |
| 5,597,519 | 1/1997 | Martin et al. . |
| 5,681,634 | 10/1997 | Miyamoto et al. . |
| 5,716,761 | 2/1998 | Iida et al. . |
| 5,779,855 | 7/1998 | Amo et al. . |
| 5,785,793 | 7/1998 | Arai et al. . |
| 5,888,433 | * 3/1999 | Amo .................................... 264/1.33 |
| 6,108,933 | * 8/2000 | Vromans et al. ................. 156/275.5 |

* cited by examiner

Primary Examiner—Michael W. Ball
Assistant Examiner—Michael A. Tolin
(74) Attorney, Agent, or Firm—Flynn, Thiel, Boutell & Tanis, P.C.

(57) ABSTRACT

A method of manufacturing an optical disc which is capable of speeding up the curing of an adhesive and capable of reducing an area or space occupied by a curing unit when manufacturing an optical disc, and a method of manufacturing an optical disc which is not susceptible to heat from a curing unit or a UV irradiation unit while an adhesive is cured. The method of manufacturing an optical disc includes a step of supplying lower and upper disc substrates, a step of spreading an adhesive between the lower and upper discs, and a step of irradiating the adhesive spread between the lower and upper discs with UV, wherein the irradiation step is performed on a turntable.

11 Claims, 7 Drawing Sheets

METHOD OF MANUFACTURING OPTICAL DISCS

BACKGROUND OF THE INVENTION

1. Field of the Invention

The present invention relates to a method of manufacturing an optical disc, more particularly to a method of manufacturing the optical disc by bonding an upper disc plate and a lower disc plate.

2. Prior Art

Computers have made a dramatic leap forward in processing capacity and processing speed. Particularly, storage density of a storage medium has been dramatically improved. Among storage memories, a so-called storing disc, particularly an optical disc is convenient to be carried and has various uses as a storage memory.

An optical disc is generally structured by a discoid substrate made of a synthetic resin such as polycarbonate. Signal pits as information signals are generally recorded in the disc substrate, and a reflecting film such as aluminum, nickel, etc. are formed on signal pits. A protecting resin layer, such as UV curing resin (a so-called UV resin) is formed on the reflecting film so as to protect the signal pits.

The thickness of the disc substrate is generally 0.6 mm in view of storage of signals, manufacturing limitation and strength of the disc substrate. Accordingly, if two pieces of disc substrates each having 0.6 mm in thickness are bonded by an adhesive, the thickness becomes 1.2 mm that is a standard of a compact disc.

Meanwhile, the inventors of the present invention developed a system (U.S. Pat. No. 5,779,855) which comprises a series of processes including an adhesive spreading step and an adhesive curing step in a method of manufacturing an optical disc.

In the system, there are employed processes for bonding two disc substrates, then irradiating the adhesive with UV to cure the adhesive in a state where they are pressed by UV transmittance plates from the upper and lower sides thereof.

In the system, two disc substrates are irradiated with UV and an adhesive is cured while the substrates are moved by a belt conveyer in a curing unit in a state where they are placed on a base table.

After the two disc substrates are passed away from the curing unit, the UV transmittance plates are taken out and bypassed from a main stream of process, then the two disc substrates are delivered to a bonding unit by another belt conveyer.

The base table from which the UV transmittance plates are taken out are fed to the bonding unit by a belt conveyer and two new disc substrates are placed on the base table.

The UV transmittance plates which were taken out from the base table and bypassed from the mainstream are placed on the two new disc substrates. The two new disc substrates are fed to the curing unit, and these operations are repeated.

According to the system set forth above, two disc substrates are placed on the base table and moved by the belt conveyer so that the two disc substrates become unstable in motion.

Particularly, since the two disc substrates are irradiated with UV while they are moved in the curing unit by the belt conveyer in a state where they are placed on the base table, the irradiation time becomes long and the two disc substrates are susceptible to heating by a light source incorporated into the curing unit. Further, since the UV transmittance plates in addition to the base table are moved by the belt conveyer, the conveying or delivering part occupies a large space in the system which is inefficient in view of consumption of energy.

SUMMARY OF THE INVENTION

The present invention solved the problems of the prior art method of manufacturing an optical disc.

That is, it is an object of the present invention to provide a method of manufacturing an optical disc capable of speeding up the curing of an adhesive and of reducing an area or space occupied by a curing unit in the optical disc manufacturing apparatus as much as possible.

It is another object of the present invention to provide a method of manufacturing an optical disc which is not susceptible to heat from a curing unit or a UV irradiation unit while an adhesive is cured.

To solve the above problems, the inventors of the present invention endeavored themselves to study these problems of the prior art method and have found out that if a turntable is used instead of a belt conveyer, it can solve the problems of curing speed and the space problem of a curing unit as set forth above. Further, the inventors also have found out that a UV light source can be separated from the disc substrate by use of a turntable.

That is, it is a first aspect of the invention to provide a method of manufacturing an optical disc comprising a step of supplying lower and upper discs, a step of spreading an adhesive between the lower and upper discs, and a step of irradiating the adhesive spread between the lower and upper discs with UV, wherein the irradiation step is performed on a turntable.

In the method in the first aspect of the invention, the irradiation step is performed by a UV irradiation unit having a light source provided away from the turntable.

It is a second aspect of the invention to provide a method of manufacturing an optical disc comprising a step of supplying lower and upper discs, a step of spreading an adhesive between the lower and upper discs, a step of placing bonded lower and upper discs on a UV transmittance table, said UV transmittance table being disposed so as to cover a through hole of a turntable, a step of placing the bonded lower and upper discs on a UV transmittance plate, a step of irradiating the bonded lower and upper discs with UV from the lower side of the UV transmittance table and from the upper side of the UV transmittance plate at the same time so as to cure the adhesive to form an optical disc, a step of taking up the optical disc from the UV transmittance plate, and a step of taking out the bonded lower and upper discs from the UV transmittance plate.

The method according to the second aspect of the invention further includes a step of inspecting the tilting of the optical disc.

In the method according to the second aspect of the invention, the taking out step is performed on the same turntable.

In the method according to the second aspect of the invention, the irradiation step is performed by a UV irradiation unit having a light source provided away from the turntable.

In the method according to the second aspect of the invention, the irradiation step is performed in a manner that a gas generated when the adhesive is cured is sucked by a hood surrounding the bonded upper and lower discs.

In the method according to the second aspect of the invention, the UV transmittance plate is placed on the turntable.

In the method according to the second aspect of the invention, the continuous steps from the disc placing step on the UV transmittance table to the optical disc taking out step include a step of centering the UV transmittance table, UV transmittance plate and bonded disc substrates by a boss which is inserted into the UV transmittance plate and the central holes of the bonded disc substrates, thereby expanding inner surfaces of the holes outward.

The method according to the second aspect of the invention further comprises a boss provided on the UV transmittance table for centering the UV transmittance table, UV transmittance plate and bonded disc substrates.

In the method according to the second aspect of the invention, the UV transmittance plate is quartz glass.

PREFERRED EMBODIMENT OF THE INVENTION

A method of manufacturing an optical disc is now explained in detail with reference to the attached drawings.

Figure 1:
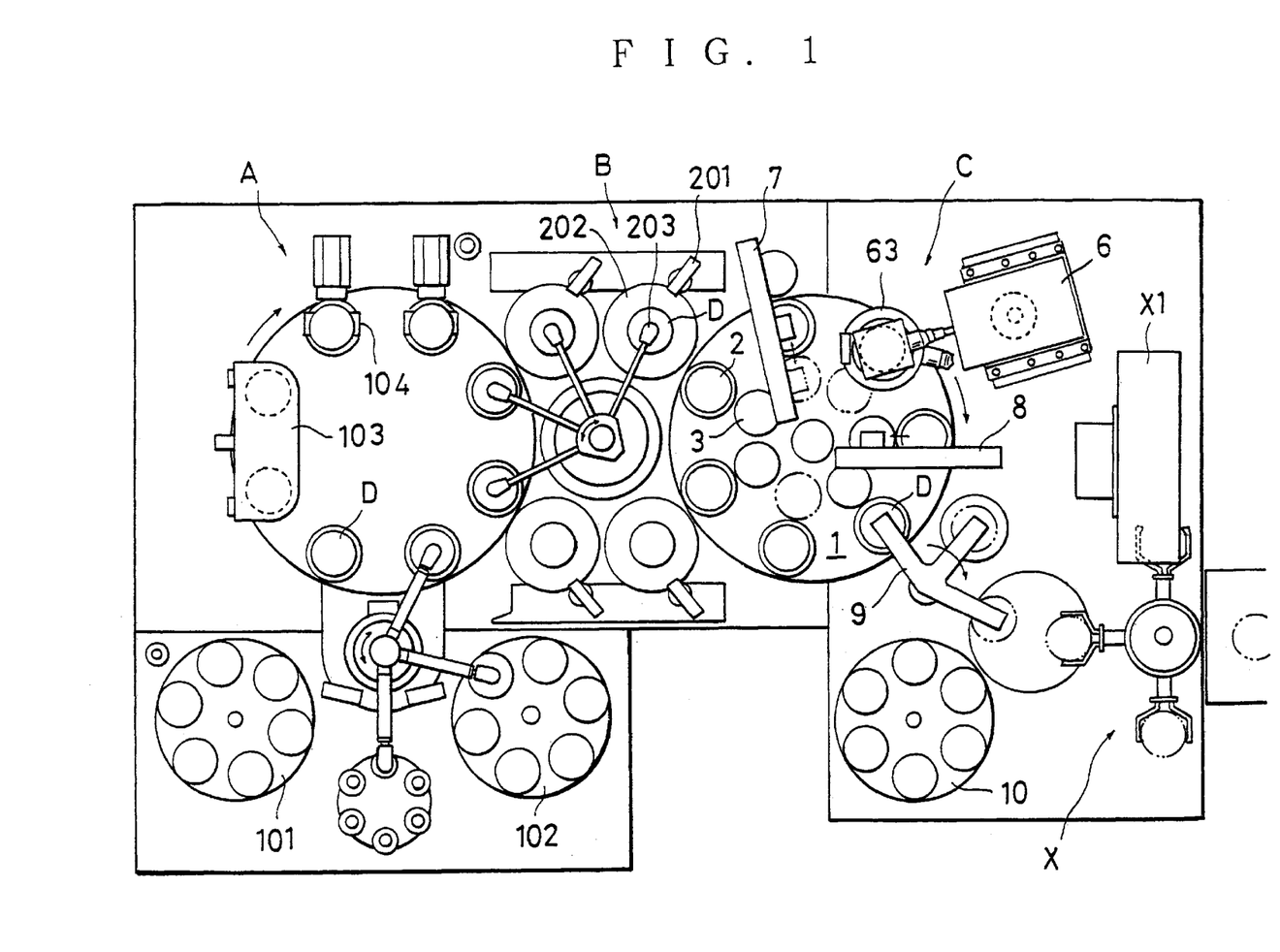
FIG. 1 is a schematic view showing the entire optical disc manufacturing apparatus.

FIG. 1 is a schematic view showing the entire optical disc manufacturing apparatus. The optical disc manufacturing apparatus comprises a substrate supply part for supplying upper and lower disc substrates to a portion where a next step is performed, an adhesive spread part for spreading an adhesive between the supplied disc substrates and a UV curing part for curing the adhesive interposed between the bonded disc substrates.

The optical disc manufacturing apparatus may have another operating part such as an inspection part in addition to the above three parts. If the inspection part is provided, an inspecting step is performed in this part.

Figure 7:
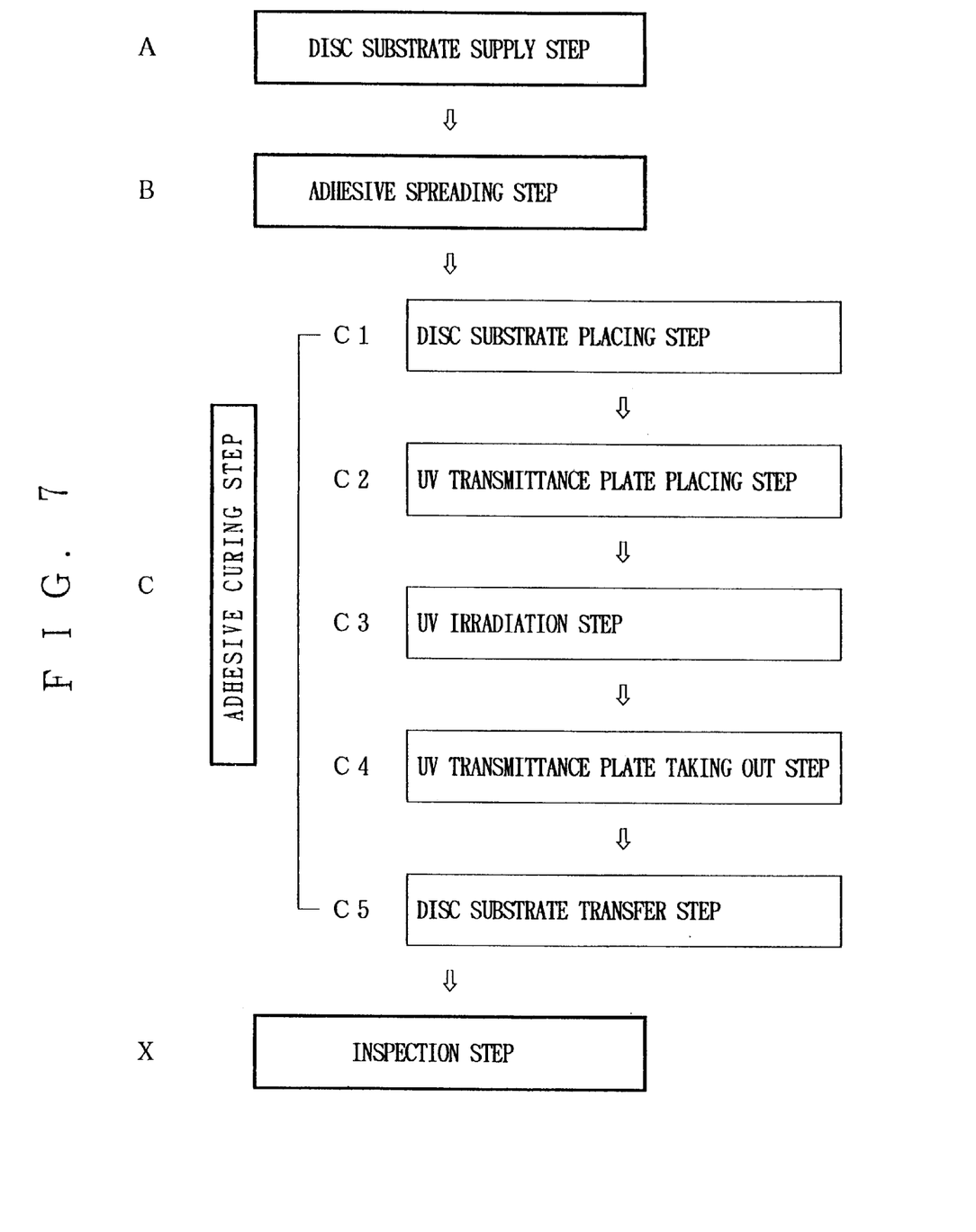
FIG. 7 is a block diagram showing respective steps.

Respective steps are described hereinafter with reference to FIG. 7.

A reference numeral D2 depicts an upper disc substrate, D1 depicts a lower disc substrate, and D depicts two bonded substrates.

[Disc Substrate Supply Step A]

First, a lower disc substrate D2 is placed on a turntable by a chuck from a stocker 102.

Then, an upper disc substrate D1 is placed on the turntable by a chuck from a stocker 101.

Dust or static electricity is removed from the respective disc substrates D1 and D2 by a cleaner 103. While the lower disc substrate D2 stands ready, i.e., remains placed on the turntable, the upper disc substrate D1 alone is reversed by a reverser 104 and it is positioned in the manner so that the face of the upper disc substrate D1 is directed downward so as to confront the lower disc substrate D2.

In such a manner, the respective disc substrates D1 and D2 are ready to move to the next step.

[Adhesive Spreading Step B]

Two rotary tables 202 are disposed side by side for spreading an adhesive. The lower disc substrate D2 is placed on the rotary table 202 by a suction chuck 203 from the turntable in the supply step. The adhesive is coated on the lower disc substrate D2 like a doughnut shape from a resin dispenser 201. In this case, since the adhesive is coated on the lower disc substrate D2 from the resin dispenser 201 in a state where the rotary table 202 is rotated at low speed, the adhesive is coated like a doughnut shape.

Then, the upper disc substrate D1 is placed on the lower disc substrate D2 on which the adhesive is coated using a suction chuck 203. Subsequently, the adhesive coated between the disc substrates D1 and D2 is uniformly expanded and spread when the rotary table 202 is rotated at high speed. The disc substrates D1 and D2 having the adhesive spread therebetween are moved to a next step using the suction chuck 203.

[Adhesive Curing Step C]

[Disc Substrate Placing Step C1]

Figure 2:
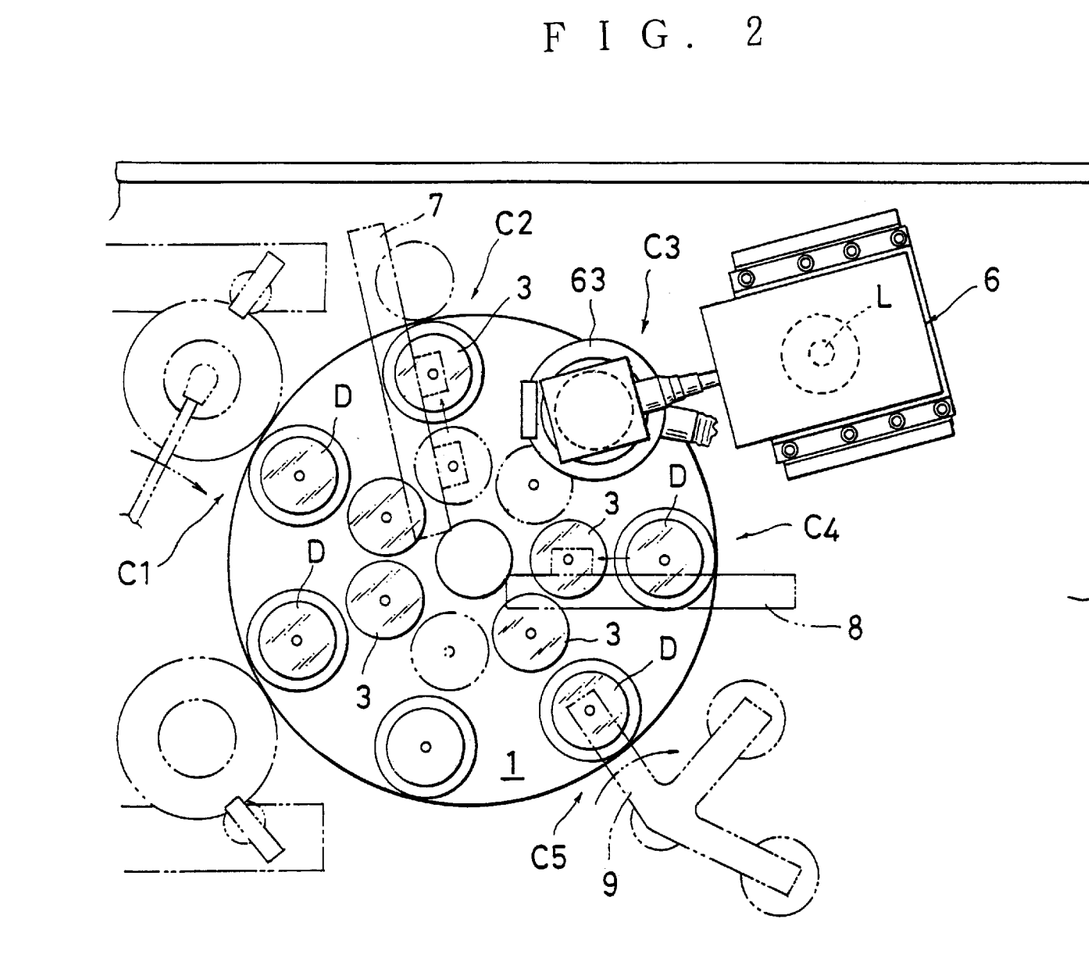
FIG. 2 is a view showing a turntable for achieving an adhesive curing process.

The two disc substrates D1 and D2 which were subjected to the spreading step (hereinafter simply referred to as bonded substrate D) are placed on the turntable 1, as shown in FIG. 2, by the suction chuck 203 from the rotary tables 202.

[UV transmittance Plate Placing Step C2]

A special receiving table for transmitting light therethrough, described later, is disposed on the turntable 1. That is, a UV transmittance table 2, which is disposed on the turntable 1 so as to cover a circular through hole, described later, is used as the receiving table. The UV transmittance table 2 is disposed on the turntable 1 in the manner that the diameter of the UV transmission table 2 is engaged in the periphery of the through hole of the turntable 1. There are seven through holes in the turntable 1, and hence the even UV transmittance tables 2 are disposed on the turntable 1. The UV transmittance table 2 is explained more in detail later with reference to FIGS. 4 and 5.

After the bonded disc substrates D are placed on the receiving table, i.e., on the UV transmittance table 2, the turntable 1 is rotated at a prescribed angular interval and is positioned or centered to reach a taking up chuck 7. The taking up chuck 7 grips the UV transmittance plate 3 placed on a holding part 12 (see FIG. 5) provided on the middle of the turntable 1, then it places the UV transmittance plate 3 on the bonded disc substrate D placed on the UV transmittance table 2. More specifically, the UV transmittance plate 3 is moved toward the UV transmittance table 2 by the taking up chuck 7 and is placed on the bonded disc substrates D is placed on the UV transmittance table 2 outside the UV transmittance plate 3. Since the UV transmittance plate 3 is placed on the bonded disc substrates D, the bonded disc substrates D do not warp and become stable. There are seven UV transmittance plates 3 on the turntable 1 corresponding to the seven UV transmittance tables 2 provided on the turntable 1 inside the portion where the UV transmittance tables 2 are disposed.

[UV Irradiation Step C3]

Then, the turntable 1 is turned at a prescribed angular interval and is centered to reach a UV irradiation position. At this position, the bonded disc substrates D are irradiated with UV by a UV irradiation unit 6 from the upper and lower sides thereof. In this case, since the bonded disc substrates D are clamped by the UV transmittance plate 3 and the UV transmittance table 2 through which UV can pass, the bonded disc substrates D can be irradiated with UV from the upper and lower sides thereof without any hindrance.

The bonded disc substrates D are irradiated with UV for two to three seconds, whereby the adhesive interposed between the disc substrates D1 and D2 is rapidly cured.

Since the bonded disc substrates D are irradiated with UV from both sides thereof, the upper and lower surfaces of the bonded disc substrates D are uniformly irradiated with UV, namely, there does not occur any polarization of UV irradiation on both surfaces of the bonded disc substrates D, so that the bonded disc substrates D are prevented from warping, namely, there does not occur warp phenomenon. Further, since the bonded disc substrates D are clamped by the UV transmittance plate 3, the warp phenomenon is surely prevented.

Figure 3:
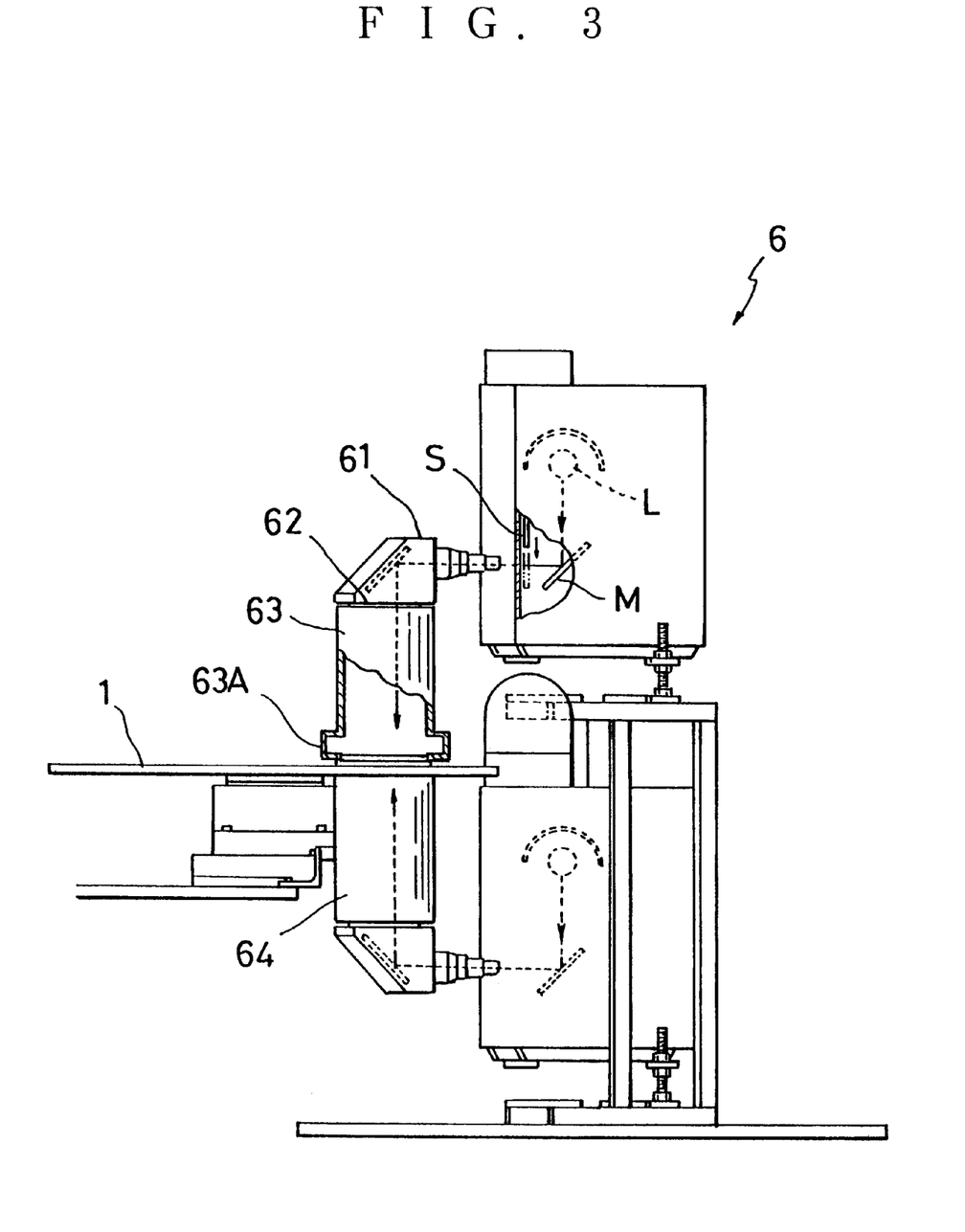
FIG. 3 is a schematic view of a UV irradiation unit.

FIG. 3 is a schematic view of a UV irradiation unit.

As shown in FIG. 3, an irradiation port 62 of the UV irradiation unit 6 is disposed by way of a light path which is longer than a light source L positioned away from the turntable 1. That is, the UV irradiation unit 6 has the irradiation port 62 at the positioned away from the light source L by way of an arm part 61. The light path is closed or opened by a shutter S. As described above, since the light path is made large by the provision of the arm part 61 and the light source L is positioned away from the arm part 61 as far as possible, the bonded disc substrates D placed on the UV transmittance table 2 over the turntable are not influenced by the heat from the light source L, namely, the bonded disc substrates D are not susceptible to the heat.

The strength of UV which is irradiated vertically from the irradiation port 62 needs to be adaptable to the characteristics of the respective disc substrates D1 and D2, and the strength of the UV from the respective UV irradiation sources may be adjusted in such a sense. There an upper hood 63 and a lower hood 64 are provided so as to cover the light path through which UV is irradiated on the bonded disc substrates D and which is positioned perpendicularly relative to the bonded disc substrates D because UV passing through the light path irritates eyes of an operator.

These upper and lower hoods 63 and 64 are extended from the upper and lower irradiation ports 62 and reach the upper surface of a reflecting mirror described later in the manner of covering the bonded disc substrates D. Further, gas is generated when the adhesive of the bonded disc substrates D are cured by the irradiation of the UW, and hence a suction part 63A is provided on the upper hood 63 which extends from the upper irradiation port 62.

Accordingly, an operator is safe because the gas is sucked through the suction part 63a.

Since the generated gas does not reach the lower side of the turntable 1, it is not necessary to suck the gas through the lower hood 64.

[UR Transmittance Plate Taking Out Step C4]

Upon completion of the irradiation with UV, the turntable 1 is turned at a prescribed angular interval and is centered to reach a taking out chuck 8 of the UV transmittance plate 3. Then, the UV transmittance plate 3 placed on the bonded disc substrates D (which is placed on the UV transmittance table 2) is taken out by the taking out chuck 8. The taken out UV transmittance plate 3 is returned to the holding part 12 (see FIG. 5) on which the UV transmittance plate 3, which is provided inside the turntable 1, is placed.

[Disc Substrate Transfer Step C5]

The bonded disc substrates which are taken out from the UV transmittance plate 3 become an optical disc when the adhesive is cured.

The optical disc is separated from the turntable 1, and is transferred to another position by a transfer chuck 9, for example, transferred to a part where an inspection step is performed.

[Inspection Step X]

In the inspection step, it is decided whether or not the optical disc has sufficient quality conforming to predetermined standards. The inspection items are different depending on the predetermined standards. For example, the degree of tilting of the optical disc is inspected by a tilt measuring unit X1. If the optical disc is up to the standard, it is placed and accumulated on a standard stocker 10.

The optical disc is completed by the steps set forth above.

Figure 6:
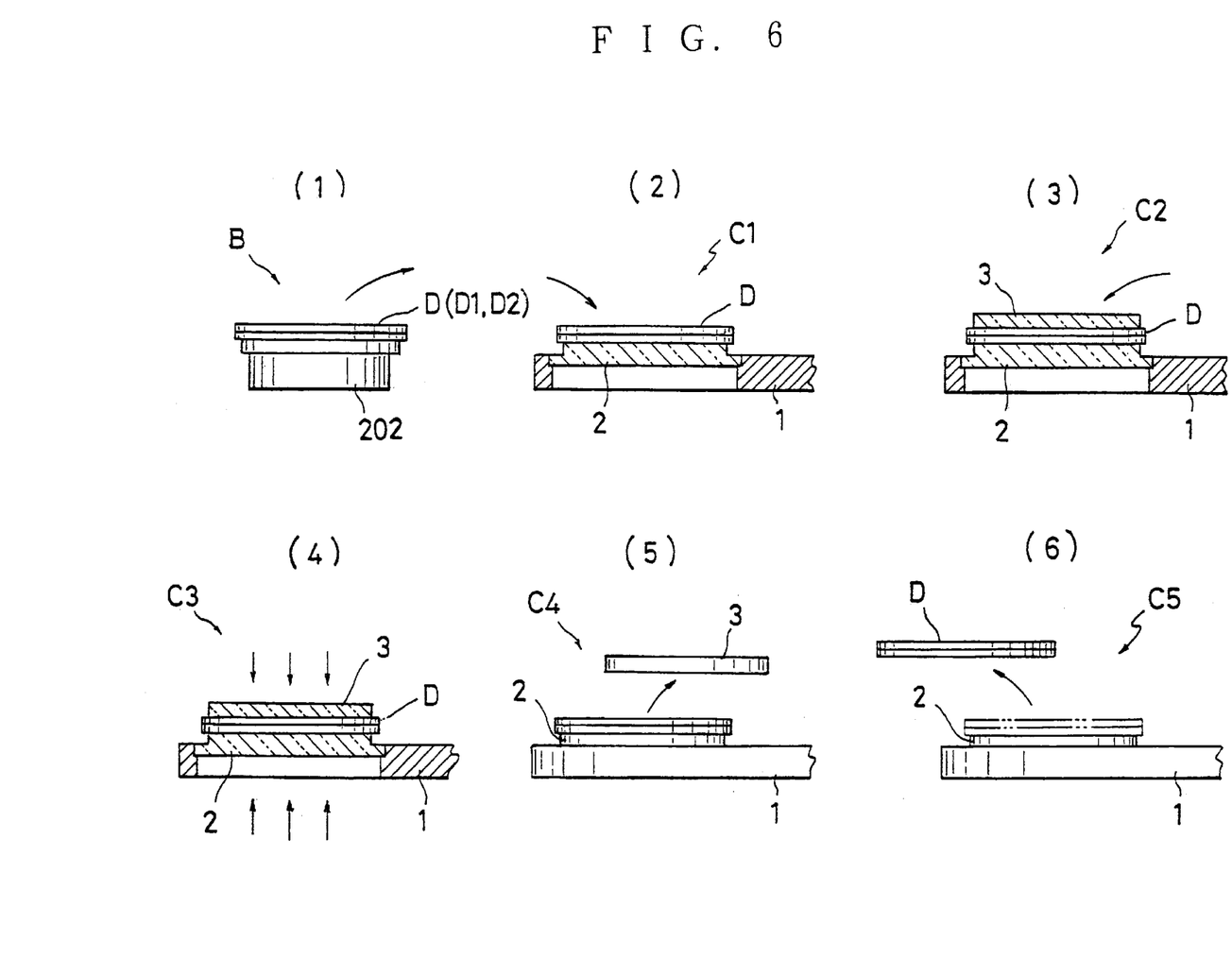
FIG. 6 is a schematic view showing each step in an adhesive curing process upon completion of an adhesive spreading step.

FIG. 6 is a view schematically showing the state where the bonded disc substrates D are placed on the turntable 1 in the adhesive curing step, and the curing of the adhesive is completed. Here, the reflecting mirror is omitted.

FIG. 6(1) shows that the bonded disc substrates D (disc substrates D1 and D2) are taken out from the rotary table 202 upon completion of the adhesive spreading step.

As shown in FIG. 6(2), the bonded disc substrates D are placed on the UV transmittance table 2 over the turntable 1, then as shown in FIG. 6(3), the UV transmittance plate 3 is placed on the bonded disc substrates D. Thereafter, as shown in FIG. 6(4), the bonded disc substrates D are irradiated with UV from the upper and lower sides thereof so that the adhesive (UV curing resin) is cured. Subsequently, as shown in FIG. 6(5), the UV transmittance plate 3 is taken out from the bonded disc substrates D. Finally, as shown in FIG. 6(6), the bonded disc substrates D are taken out from the UV transmittance table 2.

Figure 4:
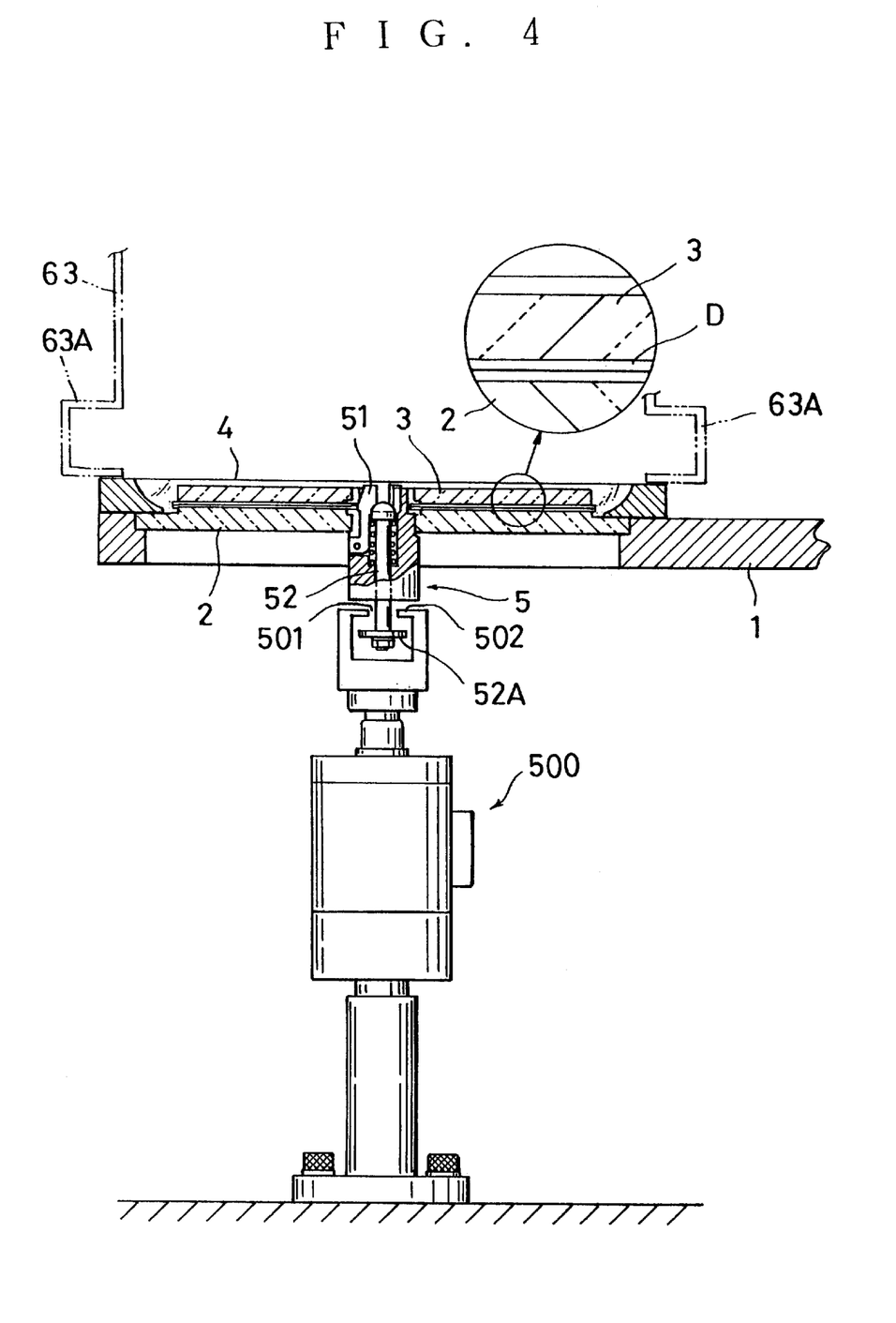
FIG. 4 is a view showing a UV transmittance table during a UV irradiation step.

Meanwhile, FIG. 4 shows the UV transmittance table 2 and its surroundings in the UV irradiation step. Although, the upper hood 63 is depicted in broken lines, the position of the upper hood 63 is shown, for reference, using FIG. 4, and hence the UV irradiation unit, i.e., hood is not disposed in the position where a moving unit 500 is disposed.

It is understood that the UV transmittance table 2 is disposed so as to cover or close each through hole 11 of the turntable 1.

The UV transmittance table 2 comprises a large diameter portion and a small diameter portion wherein the UV transmittance table 2 is supported by the turntable 1 when the large diameter portion is engaged in the turntable 1. The bonded disc substrates D are placed on the UV transmittance table 2, and the UV transmittance plate 3 is placed on the bonded disc substrates D. The UV transmittance plate 3 is provided for clamping the bonded disc substrates D between itself and the UV transmittance table 2, and the diameter of the UV transmittance plate 3 is preferably slightly smaller than that of the bonded disc substrates D. The small diameter portion of the UV transmittance table 2 is also preferably slightly smaller than that of the bonded disc substrates D.

A cylindrical reflecting mirror 4 is attached to the turntable 1 so as to press the UV transmittance table 2 from the upper side thereof. The cylindrical reflecting mirror 4 is provided so that the ends of the bonded disc substrates D are surely irradiated with the UV in the UV irradiation step.

Since the bonded disc substrates D are clamped by the UV transmittance table 2 and UV transmittance plate 3 at the upper and lower sides thereof, the bonded disc substrates D are prevented from warping by the weight of the UV transmittance plate 3. The UV transmittance table 2 and UV transmittance plate 3 may be formed of a plate made of a material through which UV can be sufficiently passed, for example, a heat-resistant glass plate such as quartz glass or PYREX (trademark).

Meanwhile, the UV transmittance table 2 is bored at the center thereof to define a hole, and a boss 5 is fixed in this central hole. The boss 5 positions or centers three elements, namely, the UV transmittance table 2, UV transmittance plate 3, and bonded disc substrates D, and particularly, the boss 5 centers the bonded disc substrates D, and the diameter of the boss 5 is can be increased. More specifically, the boss 5 has a plurality of pawls 51 and it is inserted into the central holes of the UV transmittance plate 3 and bonded disc substrates D wherein the respective pawls 51 are moved outwardly or radially to expand outwardly against the inner peripheral surfaces of the central holes of the UV transmittance plate 3 and the bonded disc substrates D. Accordingly, the UV transmittance table 2, UV transmittance plate 3 and bonded disc substrates D can be surely positioned or centered.

The outward movement of the pawls 51 of the boss 5 is performed when a center pin 52 pushes up the pawls 51 from the inner side thereof. The downward movement of the center pin 52 can be performed when a hook 502 of the moving unit 500 fixed to a floor or a fixed table pulls down a washer 52A of the center pin 52. The upward returning of the center pin 52 can be performed by a spring which resiliently pushes the center pin 52 upward.

A plurality of moving units 500 are disposed under respective portions of the turntable such as disc substrate placing part, the UV transmittance plate placing part, the UV transmittance plate taking out part, and the disc substrate transfer part. However, the diameter of the boss 5 can be sufficiently decreased by pressing the pawls 51 even if the diameter of the boss 5 is not decreased when the bonded disc substrates D are placed or taken out from the boss 5 because the UV transmittance plate is strong. Accordingly, the moving unit 500 may be disposed only on the disc substrate placing part and the disc substrate taking out part. The boss 5 fixed to the UV transmittance table 2 by the rotary motion of the turntable 1 is connected to the moving units 500 which are respectively disposed on respective parts under the turntable as set forth above. That is, the center pin 52 of the boss 5 passes through a guide gap 501 in a space of the moving unit and moves perpendicularly relative to the paper surface, then it is disposed in the moving unit 500.

In this state, when the center pin 52 is pulled down by the moving unit 500, the diameter of the boss 5 is decreased. More specifically, the pawls 51 are inclined inward by their own weights and the diameter of the boss 5 is decreased. When the moving unit 500 rises upward, the center pin 52 moves upward by the resilience of the spring so that the diameter of the boss 5 is increased.

Figure 5:
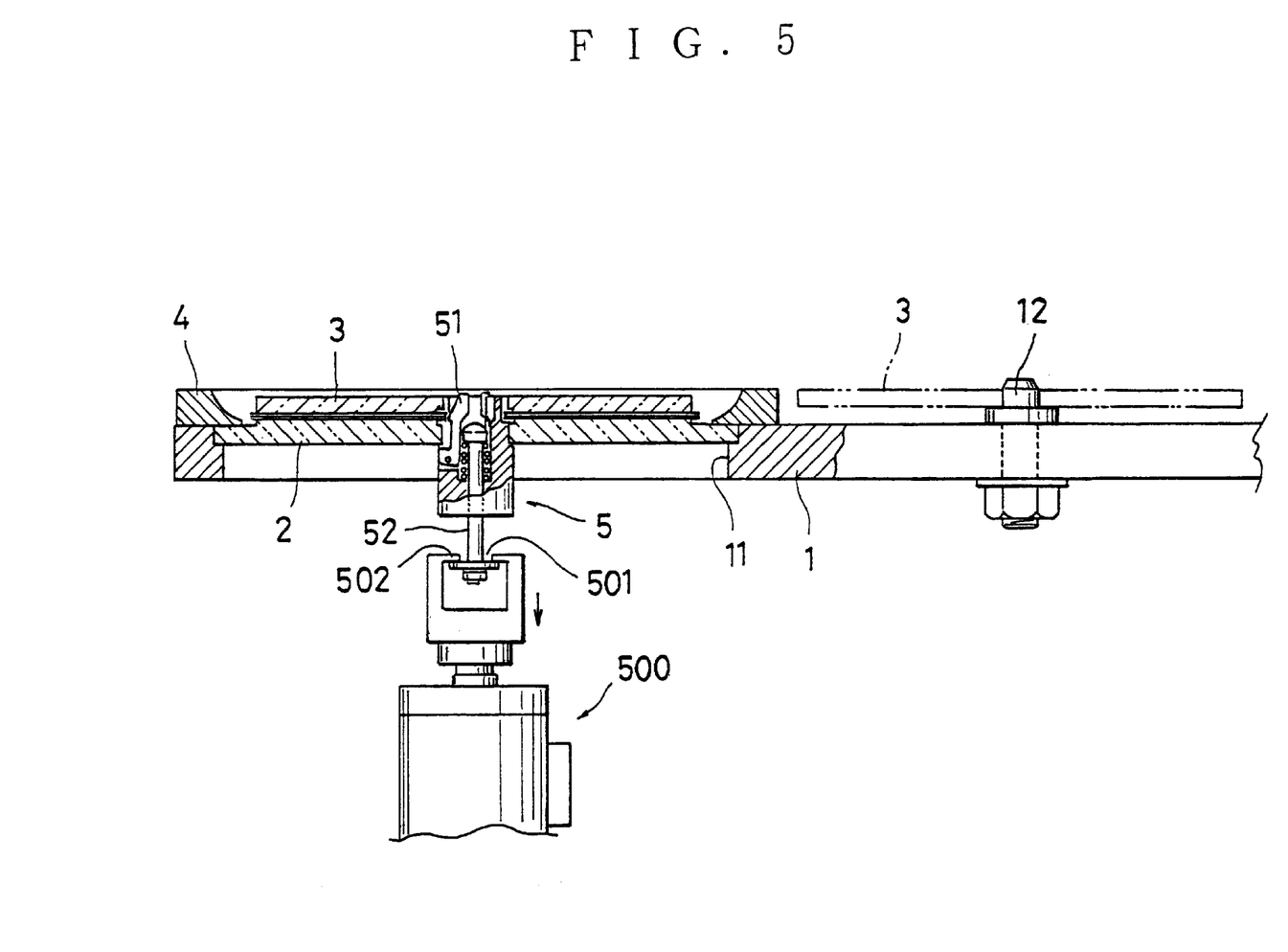
FIG. 5 is a view showing a UV transmittance table during a UV transmittance plate placing step.

FIG. 5 shows the UV transmittance table 2 and its neighborhood in a step of placing the UV transmittance plate 3 on the bonded disc substrates D. In this case, the center pin 52 of the boss 5 is moved downwardly so that the diameter of the boss 5 is decreased. Accordingly, the UV transmittance plate 3 is placed on the bonded disc substrates D without any hindrance. Thereafter, the center pin 52 rises upward, and hence the diameter of the boss 5 is increased to perform the positioning or centering.

As mentioned above, the moving unit 500 operates to increase or decrease the diameter the boss 5 in the disc substrate placing step, the UV transmittance plate placing step, the UV transmittance plate taking out step, and the disc substrate transfer step, etc.

It is understood that the present invention is not limited to the embodiment set forth above but it can be modified variously without departing the spirit of the invention. For example, the shape and the number of dispositions of the UV irradiation unit can be freely designed. The shape of the UV transmittance plate is not limited to the circular one shown but it may be of any shape if the optical disc can be clamped by at least two UV transmittance plates.

Inasmuch as the present invention has the construction set forth above, the warp phenomenon of the optical disc can be prevented and the curing of the optical disc can be efficiently preformed.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method of manufacturing an optical disc comprising:
   a step of supplying lower and upper disc substrates;
   a step of spreading an adhesive between the lower and upper disc substrates;
   a step of placing bonded disc substrates on a UV transmittance table, said UV transmittance table being disposed so as to cover a through hole of a turntable and having a boss which is expandable against hole-defining inner surfaces of the respective upper and lower disc substrates;
   a step of placing a UV transmittance plate on the bonded disc substrates;
   a step of irradiating the bonded disc substrates with UV from a lower side of the UW transmittance table and from an upper side of the UV transmittance plate at the same time so as to cure the adhesive to form an optical disc;
   a step of taking up the UV transmittance plate from the bonded disc substrates;
   a step of taking out the bonded disc substrates from the UV transmittance table;
   wherein the step of irradiating the bonded disc substrates with UV comprises irradiating UV from a light source which is spaced away from the turntable and has a projecting arm through which irradiation is supplied to an irradiation port which directs irradiation toward the bonded disc substrates;
   wherein the step of placing the bonded disc substrates on the UV transmittance table comprises moving a plurality of pawls of the boss radially outwardly with a center pin to center the bonded disc substrates relative to one another; and
   wherein the step of placing the UV transmittance plate on the bonded disc substrates comprises moving the plurality of pawls of the boss radially outwardly with the center pin to center the UV transmittance plate and the bonded disc substrates relative to one another.

2. The method according to claim 1, wherein the taking out step is performed while the UV transmittance table is supported on the turntable.

3. The method according to claim 1, wherein the irradiation step further includes removing a gas generated when the adhesive is cured by suction with a hood surrounding the bonded disc substrates.

4. The method according to claim 1, wherein the UV transmittance plate is placed on the turntable.

5. The method according to claim 1, wherein the UV transmittance plate is quartz glass.

6. A method of manufacturing an optical disc, said method comprising the steps of:
   (1) providing a pair of disc substrates;
   (2) spreading an adhesive between the pair of disc substrates and bonding same to one another;
   (3) placing the bonded disc substrates on a UV transmittance table positioned on a turntable;

(4) disposing a UV transmittance plate on the bonded disc substrates so that the bonded disc substrates are sandwiched between the UV transmittance plate and the UV transmittance table; and (5) curing the adhesive by directing irradiation to the bonded disc substrates from both a lower side of the UV transmittance table and an upper side of the UV transmittance plate from an irradiation unit which is spaced radially outwardly from the turntable to prevent overheating of the bonded disc substrates due to heat generated by the irradiation unit, wherein the irradiation directed to the bonded disc substrates from the upper side of the UV transmittance plate is directed along a non-linear path from the irradiation unit to the bonded disc substrates.

7. The method according to claim 6 wherein the irradiation directed to the bonded disc substrates from the lower side of the UV transmittance table is directed along a non-linear path from the irradiation unit to the bonded disc substrates.

8. The method according to claim 7 wherein the irradiation unit includes upper and lower sidewardly projecting arms, and said method further includes supplying irradiation through the upper and lower arms to respective upper and lower irradiation ports disposed adjacent the upper side of the UV transmittance plate and the lower side of the UV transmittance table, respectively.

9. The method according to claim 6 wherein the irradiation unit includes a sidewardly projecting arm, and said method further includes supplying irradiation through the arm to an irradiation port disposed adjacent the upper side of the UV transmittance plate.

10. The method according to claim 6 wherein the UV transmittance table includes a boss defined by a plurality of pawls which are radially movable by a pin disposed centrally within the boss, and said step (3) further includes actuating the pin so as to move the pawls radially inwardly to permit unhindered loading of the bonded disc substrates on the boss and thereafter actuating the pin so as to move the pawls radially outwardly to expand the boss within centrally located holes of the respective disc substrates to align same with one another.

11. The method according to claim 10 wherein said step (4) further includes actuating the pin so as to move the pawls radially inwardly to permit unhindered loading of the UV transmittance plate on the boss and thereafter actuating the pin so as to move the pawls radially outwardly to expand the boss and align the UV transmittance plate with the bonded disc substrates.

* * * * *